UNITED STATES PATENT OFFICE.

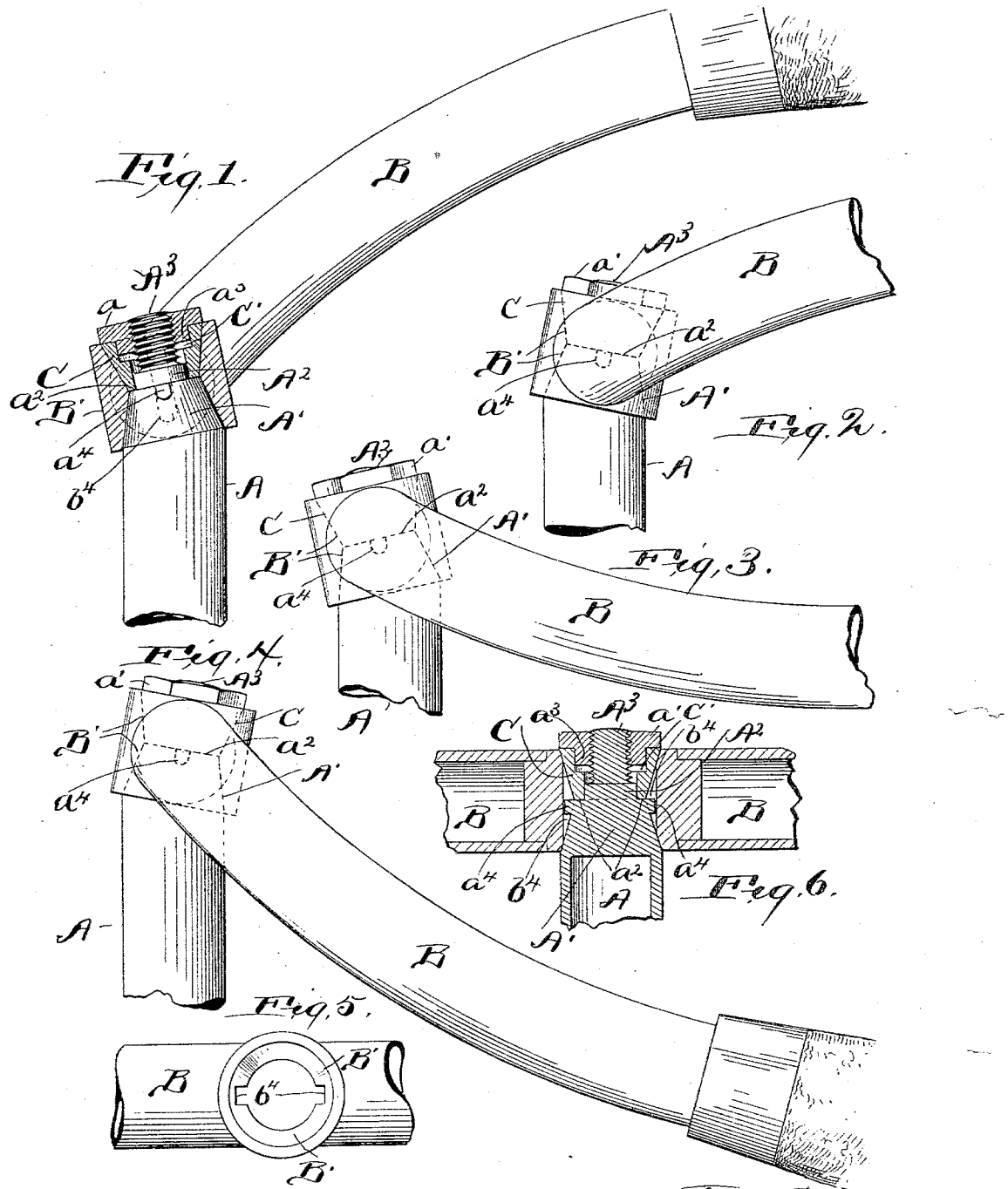

DAVID S. HITCHCOCK, OF CLEVELAND, OHIO, ASSIGNOR TO THE WHITE SEWING MACHINE COMPANY, OF SAME PLACE.

HANDLE-BAR FOR BICYCLES.

SPECIFICATION forming part of Letters Patent No. 566,581, dated August 25, 1896.

Application filed November 5, 1895. Serial No. 568,070. (No model.)

*To all whom it may concern:*

Be it known that I, DAVID S. HITCHCOCK, of Cleveland, in the county of Cuyahoga and State of Ohio, have invented certain new and useful Improvements in Handle-Bars for Bicycles, &c.; and I do hereby declare the following to be a full, clear, and exact description of the invention, such as will enable others skilled in the art to which it pertains to make and use the same.

My invention relates to bicycle-handles, which are used to direct or steer bicycles; and it consists in the peculiar construction of the socket of the handle-bar in connection with the upper end of the stem or steering-post, whereby the handle may be adjusted to different desired positions up or down.

In the drawings, Figure 1 is a view in side elevation of a steering-post of a bicycle with handle attached, showing in section a portion of the socket of the handle-bar. This view also shows the handle-bar raised to its highest position. Fig. 2 is a view illustrating the handle-bar in connection with the steering-post, showing the handle-bar in its second elevated position. Fig. 3 is a view showing the handle-bar in its first dropped position, and Fig. 4 is a view showing the handle-bar in its lowest position. Fig. 5 illustrates the socket of the handle-bar, looking at it either from the top or bottom. Fig. 6 is a section taken through the handle-bar and the upper portion of the steering-post, showing the manner of securing the handle-bar to the steering-post, and also showing my preferred method of lugs and slots for preventing the rotation of the handle-bar around the upper end of the steering-post when the handle-bar is secured in any of the positions desired.

A represents the steering-post or stem of the bicycle, which may be either directly or indirectly secured to the front forks, which afford the bearing for the steering-wheel. This stem is preferably secured in a tubular bearing at the forward end of the bicycle, as is usual.

B is the handle-bar, which is provided with a socket B'. This socket B', it will be noticed, is so formed or constructed as to have opposite conical-shaped seats, which are counterparts one of the other.

The upper end or head of the steering-post A is formed in such a manner as to snugly fit into the recess of the socket B' at either side, and is preferably formed, as shown more clearly in the drawings, Figs. 1 and 5, namely, in the shape of a frustum of a cone A' and having a projection $A^2$, with a screw-thread $A^3$ projecting, which screw-thread or stud is far enough beyond the upper end of the socket B' to engage or be engaged by a nut $a'$. Between the nut $a'$ and the annular shoulder $a^2$, formed by the intersection of the projection $A^2$ with the top of the cone A', is a conical washer C. The shape of this washer, both in cross-section and general contour, is identical with the shape of the upper end of the steering-post, which engages the socket of the handle-bar.

Preferably I provide the nut $a'$ with an annular projection $a^3$, which engages snugly a recess or seat C' in the upper end of the washer C, the object of this recess and projection being to provide a means for steadying the upper end of the washer, and hence the handle, the lower end being sustained by means of the unthreaded portion of the projection $A^2$. Extending out at either side from the upper portion of the cone A' are two studs $a^4$ $a^4$. (Shown more clearly in Fig. 6 of the drawings.) These studs engage with slots $b^4$ $b^4$, provided in the socket of the handle-bar and shown more clearly in Fig. 5 of the drawings, the object of these studs and the sockets being to prevent the rotation of the handle-bar around the upper end of the steering-post, and also prevent the misplacement of the handle-bar in relation to the steering-wheel, inasmuch as the handle-bar must, at all times, be at right angles to the wheel. Now, while I have clearly shown and described my preferred method of constructing the socket in the handle-bar in connection with the upper end of the steering-post, still I do not wish to limit myself to this mode of construction, inasmuch as, instead of using the lugs $a^4$ $a^4$ and the sockets $b^4$ $b^4$, the cross-section of the upper end of the handle-bar may be of some irregular shape, such as square, hexagon, or octagon, and the socket in the handle-bar made to conform therewith.

It will be noticed that in order to attain the four different positions shown in Figs 1, 2, 3, and 4 of the drawings I form the conical portion at the upper end of the steering-post with its axis obtuse to that of the axis of the steering-post, and by reversing the handle and turning the steering-post around the handle may be made to assume any of the different positions, as shown in the drawings.

What I claim is—

In a steering device for bicycles, the combination with the socket of a handle-bar having reversible bearings adapted to engage the upper end of the steering-post, of a steering-post provided with a projection or journal adapted to engage the sockets of the handle-bar at either side the said journal or bearing having its axis obtuse to the axis of the steering-post.

In testimony whereof I sign this specification, in the presence of two witnesses, this 27th day of September, 1895.

DAVID S. HITCHCOCK.

Witnesses:
W. E. DONNELLY,
ELLA E. TILDEN.